No. 804,505. PATENTED NOV. 14, 1905.
H. E. SCHILD.
GAS REVERSING VALVE.
APPLICATION FILED NOV. 10, 1904.
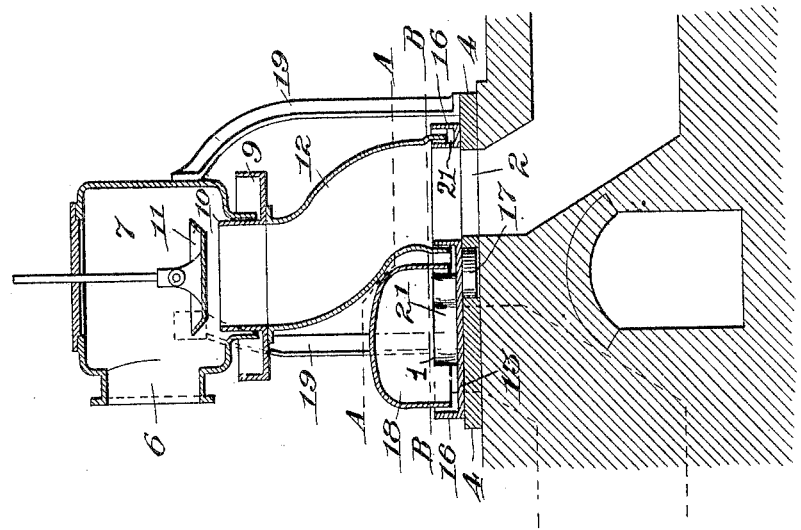
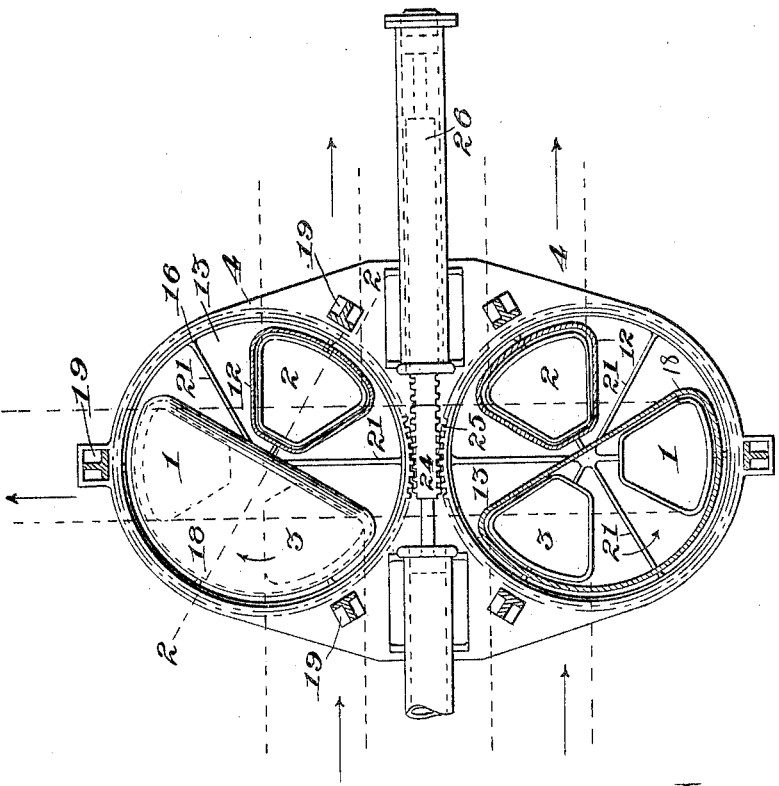
Witnesses:
Mae Hofmann
Howard S. Ohio
Inventor:
Hermann E. Schild
by Jno Crossdale
his attorney

UNITED STATES PATENT OFFICE.

HERMANN E. SCHILD, OF MONTEREY, MEXICO, ASSIGNOR TO JAMES B. LADD AND DAVID BAKER, OF PHILADELPHIA, PENNSYLVANIA.

GAS REVERSING-VALVE.

No. 804,505.  Specification of Letters Patent.  Patented Nov. 14, 1905.

Application filed November 10, 1904. Serial No. 232,080.

*To all whom it may concern:*

Be it known that I, HERMANN E. SCHILD, residing at Monterey, State of Nuevo Leon, Mexico, have invented a new and useful Gas Reversing-Valve, of which the following is a specification.

My invention relates to gas reversing-valves especially adapted for use with regenerative furnaces, and is an improvement upon the device described and claimed in patent to me, No. 661,670, dated November 13, 1900. While my former device comprises reciprocative valve elements, the invention which is the subject of the present application comprises rotative valve elements whereby I am able to provide in small space efficient reversible means for controlling the passage of air and gas by extremely simple mechanism, all exposed to the air and capable of easy access for the purpose of cleaning or repairing.

Referring to the drawings, Figure 1 is a plan view of my device, the upper half being in section on the line A A of Fig. 2, the lower half being in section on a plane indicated by the line B B of Fig. 2. Fig. 2 is a vertical section on line 2 2 of Fig. 1.

Similar numerals refer to similar parts throughout both views.

As these valves are shown in duplicate, one for controlling the gas-flues and the other for controlling the air-flues, a description of one in most respects will suffice for both.

The numeral 1 represents the aperture of flue leading to the chimney, while 2 and 3 represent the apertures of flues leading to two of the regenerators, one set being for gas, the other set being for air. These flue-apertures are arranged in a horizontal plane, radially and symmetrically located about a common point and all equidistant therefrom and from each other, said common point coinciding with the axis of rotation of the rotative elements. These apertures also lie between radii which divide a common circle into sextants, so that the spaces between the apertures are equal in dimension to the apertures. The flue-apertures 1, 2, and 3 are located in ordinary masonry, on the top of which is placed the plate 4, having suitable openings registering with the flue-apertures.

The valve which controls the gas-flues is shown in the upper half of Fig. 1 and in vertical section in Fig. 2. The gas comes through the pipe 6 into the gas-box 7. The gas-box 7 is provided with a flanged opening which projects downwardly into the pan 9. The pan 9 has a flanged opening 10, the flange projecting upwardly into the gas-box 7. The pan is adapted to be filled with water, sand, or other material that will flow readily, to form a movable seal between it and the gas-box 7. The opening through 10 is regulated in the usual way by the valve 11. The pan 9 is supported by the conducting-pipe 12, the upper opening of which registers with the opening 10 of said pan. The said conductor 12 may be secured to pan 9 by bolts or in any other suitable way. The lower end of conductor 12 is supported by plate member 13. The member 13 is a suitable body or plate, preferably machined on its under side to fit closely upon the similarly machined upper surface of plate 4. Member 13 is provided with three apertures adapted to register with the apertures 1, 2, and 3 in said plate 4. The body or plate 13 is circular in form and provided with a circumferential upwardly-extending flange 16 and also similar flanges about each of its three apertures, so that member 13 is in the form of a pan adapted to hold water for cooling and sealing purposes. Member 13 also has pivotal connection at 17 with plate 4 and is adapted to rotate about said pivot. As seen in Fig. 2, the conductor 12 is adapted to fit at its lower end about one of the flanged openings, while the hood or conductor 18 is adapted to embrace the other two flanged openings of member 13. Both conductor 12 and hood or conductor 18 are disengageable from member 13. The conductor 12 and hood or conductor 18 both rest upon ribs 21 of member 13.

It is also to be noted that gas-chamber 7 is rigidly supported on the supporting-arms 19 and is consequently stationary, while the upper opening of the conductor 12 and its superimposed pan 9 are centrally located with respect to their axis of rotation and the axis of pivot 17, so that the lower opening in gas-box 7 forms a bearing for the rotation of conductor 12.

In Fig. 1 I show an ordinary form of hydraulic piston 26 and rack means 24 for rotating said plate members 13. In the position shown in Fig. 1 the conductor 12 connects the gas-box 7 with the flue 2, while the hood or conductor 18 connects flue 3 with chimney-flue 1. By a sufficient rotation, however, of plate 13 in the direction of the arrow the conductor 12 is carried around to flue 3, while the hood or conductor 18 connects flue 2 with the chimney-flue 1.

Owing to the locations and dimensions above described of the flue-apertures and spaces therebetween it will be obvious that upon moving the valve no new communication is established between a conductor and a flue or between the outside atmosphere and a flue until communication is completely cut off from another flue, and at no time is either conductor member 12 or 18 so moved as to permit the outside atmosphere to communicate therewith. This, of course, is of the utmost importance in preventing loss of gas, the direct entrance of fresh air into the chimney and consequent waste, and also danger of explosions. This structure also obviates the necessity of closing the opening 10 between gas-box 7 and conductor 12 before reversing the valve—that is, before rotating member 13.

The water in pan or plate member 13 not only secures an efficient seal between conductor 12 and hood 18 and said member 13, but also serves to keep said member 13 and plate 4 beneath it sufficiently cool to prevent injury by the heat of the furnace. By rotating the flanged plate or member 13 to change the position of conductor 12 and hood 18 of the gas-valve or of hood 18 of the air-valve with respect to the flue-apertures I avoid the necessity of lifting said conductor or hood before causing the rotation thereof. So far as I am aware all reversible gas-valves heretofore known having rotatable parts employ mechanism for lifting said rotatable parts before or in the act of rotating the same. This is rendered necessary in all of said structures in order to disengage the channel and flange means of sealing the movable parts with the flue-apertures, which would otherwise render such rotation impossible.

The means employed for lifting the movable parts comprises heavy and complicated structures. It is believed to be a distinct advance in the art to provide means for causing the rotation of the movable conducting parts by a purely horizontal movement thereof, whereby the lifting structures may be eliminated from the rotatable reversing-valve.

The valve shown in the lower half of Fig. 1, which is for controlling the air-flues, is substantially the same as the gas-valve above described, except, obviously, it is not provided with the conductor 12 or gas-chamber 7. The flues 2 and 3 are alternately opened to the outside atmosphere by the moving of hood 18, as described.

While the device illustrated in the drawings shows a pair of simultaneously-operating valves, one for controlling the passage to and from the air-checkers and chimney, the other for controlling the passage to and from the gas-checkers and chimney, it is obvious that one may be used without the other. It is also obvious that because of the simple construction of my device the hood 18 may readily be lifted from the pan or plate member 13, and also the conducting member 12 may be separated from the pan 9 and similarly removed from member 13 for the purposes of cleaning or repairing the same. It thus follows that by reason of the simplicity and the ready accessibility to all of the parts and also by cause of the fact that the parts are all open to the air my device possesses distinct advantages over many of the complicated reverse-valves being used.

What I claim is—

1. In combination with a plurality of flues, a reversible valve, comprising a movable conducting member for connecting two of said flues, and a rotatable element disengageably sealed with the conducting member for changing the relation between said conducting member and flues by a purely horizontal rotative movement of the conducting member.

2. In combination with a plurality of flues, a reversible valve, comprising a movable conducting member for connecting two of said flues, a rotatable element disengageably connected with the conducting member for changing the relation between said conducting member and flues by a purely horizontal rotative movement of the conducting member, and means for maintaining a movable seal between the conducting member and rotatable element.

3. In combination with a plurality of flues, a reversible valve, comprising a movable conducting member for connecting two of said flues, and a water-cooled rotatable element disengageably sealed with the conducting member for changing the relation between said conducting member and flues by a purely horizontal rotative movement of the conducting member.

4. In combination with a plurality of flues, a fixed plate having apertures forming openings for said flues, a rotatable element fitting upon said plate and having corresponding apertures and a conducting member disengageably sealed with the rotatable element for connecting different flues when in different positions.

5. In combination with a plurality of flues, a fixed plate having apertures forming openings for said flues, a water-cooled rotatable element fitting upon said plate and having corresponding apertures and a conducting member disengageably sealed with the rotatable element for connecting different flues when in different positions.

6. In combination with a plurality of flues, a conductor member connecting with a gas-supply and adapted to connect with a flue, a second conductor member for connecting two other flues together, said conductor members being separate members and open to atmospheric air, and rotatable means for shifting the conductor members to connect with relatively different flues.

7. In combination with a plurality of flues, a conductor member connecting with a gas-supply and adapted to connect with a flue, a second conductor member for connecting two other flues together, said conductor members being separate members and open to atmospheric air, and water sealed and cooled rotatable means for shifting the conductor members to connect with relatively different flues.

8. In combination with a plurality of flues and a gas-supply, a reversible valve comprising two members, one for connecting the gas-supply with a flue and the other for connecting two other flues, and a rotatable plate for supporting said members and changing their relation with said flues.

9. In combination with a plurality of flues and a gas-supply, a reversible valve comprising two members, one for connecting the gas-supply with a flue and the other for connecting two other flues, and a water-sealed rotatable plate for supporting said members and changing their relation with said flues.

10. In combination with a plurality of flues and a gas-supply, a reversible valve comprising two members, one for connecting the gas-supply with a flue and the other for connecting two other flues, and a separated rotatable plate for supporting said members and changing their relation with said flues.

11. In a reversible valve for a plurality of flues, the combination of a rotatable plate having apertures corresponding to the apertures of said flues and adapted to register therewith in different positions, a conductor connected with one of said plate-apertures, a second conductor for maintaining communication between other of said plate-apertures, and means for rotating said plate to cause its apertures to register with relatively different flue-apertures.

12. In a reversible valve for a plurality of flues, a rotatable plate having apertures corresponding to the apertures of said flues and adapted to register therewith in different positions, a rotatable conductor detachably connected with the plate communicating with one of said plate-apertures, a second conductor detachably connected with said plate for maintaining communication between other of said plate-apertures, a water seal between the conductors and plate, and means for rotating said plate to cause its apertures to register with relatively different flue-apertures.

13. In a gas reversing-valve, the combination with a plurality of flues, of a rotatable plate having apertures corresponding to the apertures of said flues and adapted to register therewith in different positions of the plate, a rotatable conductor connected between a source of supply and a plate-aperture, a second conductor adapted to maintain communication between other of said plate-apertures, and means for rotating the plate to change the relative registration between its apertures and the flue-apertures.

14. In a gas reversing-valve, the combination with a plurality of flues, of a rotatable plate having apertures corresponding to the apertures of said flues and adapted to register therewith in different positions of the plate, a rotatable conductor connected between a source of supply and a plate-aperture, a second conductor adapted to maintain communication between other of said plate-apertures, a water seal between the conductors and plate, and means for rotating the plate to change the relative registration between its apertures and flue-apertures.

15. In a gas reversing-valve, the combination with a plurality of flues, of a rotatable plate having apertures corresponding to the apertures of said flues and adapted to register therewith in different positions of the plate, a rotatable conductor connected between a source of supply and a plate-aperture, a second conductor adapted to maintain communication between other of said plate-apertures, said conductors exposed to the outside atmosphere, a water seal between the conductors and plate, and means for rotating the plate to change the relative registration between its apertures and flue-apertures.

HERMANN E. SCHILD.

Witnesses:
C. BERGIN,
ALB. DOSE.